Figure 1:
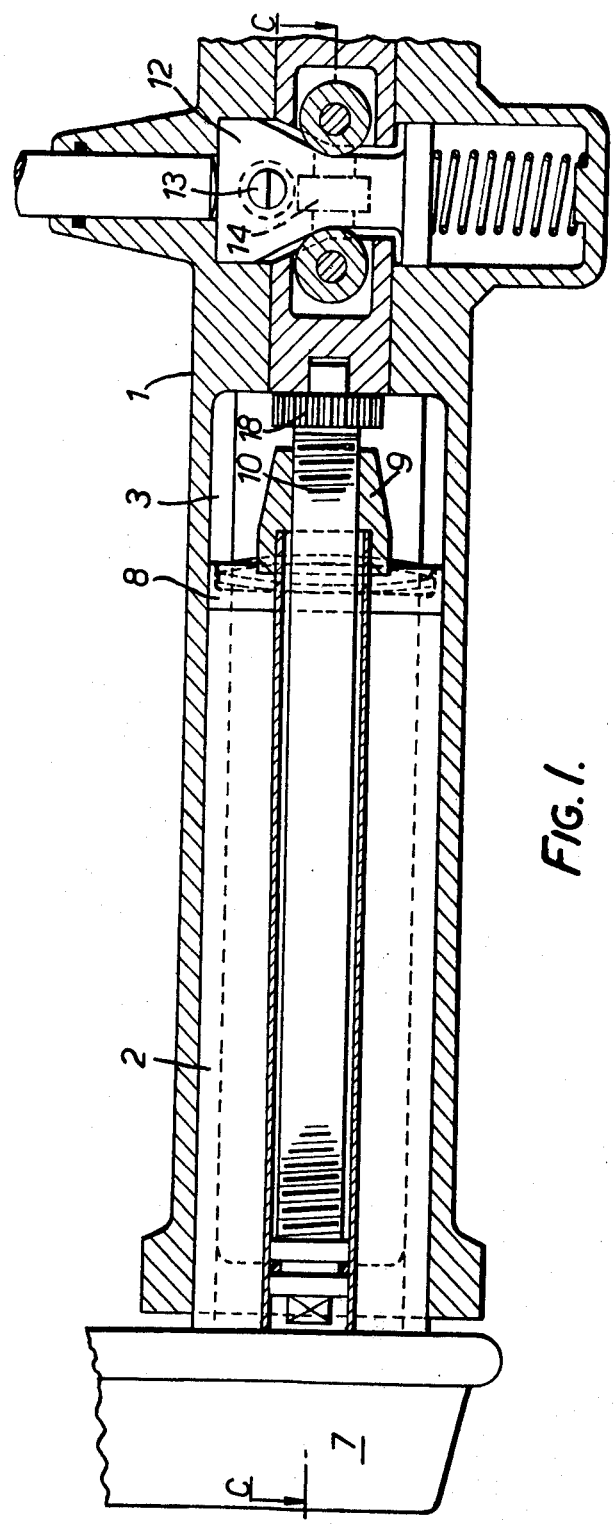

United States Patent [19]
Harrison

[11] 3,964,579
[45] June 22, 1976

[54] RAILWAY BRAKES

[75] Inventor: Anthony William Harrison, Tyseley, England

[73] Assignee: Girling Limited, Birmingham, England

[22] Filed: Aug. 29, 1975

[21] Appl. No.: 609,106

Related U.S. Application Data
[63] Continuation of Ser. No. 430,692, Jan. 4, 1974.

[30] Foreign Application Priority Data
Jan. 5, 1973 United Kingdom.................. 852/73

[52] U.S. Cl.............................. 188/71.9; 188/59; 188/72.7; 188/73.3; 188/79.5 GE; 188/196 BA

[51] Int. Cl.² ..................................... F16D 65/56

[58] Field of Search................ 188/71.1, 71.9, 72.1, 188/72.4, 72.5, 72.6, 72.7, 72.9, 73.3, 59, 196 BA, 79.5 GE, 79.5 S

[56] References Cited
UNITED STATES PATENTS

| | | | |
|---|---|---|---|
| 782,961 | 2/1905 | Haug | 188/72.9 |
| 2,804,176 | 8/1957 | Trevaskis | 188/72.5 X |
| 3,053,346 | 9/1962 | Butler | 188/73.3 X |
| 3,547,229 | 12/1970 | Pollinger et al. | 188/71.9 |

Primary Examiner—George E. A. Halvosa
Attorney, Agent, or Firm—Scrivener Parker Scrivener and Clarke

[57] ABSTRACT

A vehicle brake comprises a plurality of elongated friction members for engagement with the brake rotor, the friction members being laterally supported close to their rotor-engaging ends, and an actuating mechanism having an elongated thrust-transmitting member substantially co-extensive with the friction members and an abutment member carried by the thrust-transmitting member and engageable with the friction members.

13 Claims, 7 Drawing Figures

RAILWAY BRAKES

This is a continuation of application Ser. No. 430,692, filed Jan. 4, 1974.

This invention relates to vehicle brakes.

There is a limit to the braking power which can be applied to a brake rotor, above which premature failure of the rotor is caused by thermal crazing.

All brake pad or friction element materials expand when heated and, since these materials are not of an homogeneous nature localised high spots are frequently formed due to some regions of the friction surface of the pad swelling. The braking force, or clamp load, then becomes concentrated in these regions, to produce a very high concentration of applied braking power to the zones of the rotor rubbed by the high spots; with a consequential rapid increase of temperature in such zones leading to the production of "fire bands". At high temperatures, rapid wear of the friction material takes place usually resulting in another high spot developing at another zone of the rubbed surface. This all results in the surface layers of the rotor being rapidly heat cycled through wide temperature ranges while the bulk of the rotor remains at a relatively low temperature. It is this rapidly repeated, high temperature heat cycling of the surface layers, and the thermal stresses resulting therefrom, which eventually results in thermal crazing and destruction of the rubbed surface.

The problem is accentuated in high energy, low torque braking arrangements such as are found in railway vehicle brakes, for a number of reasons:

a. The long braking periods cause steep temperature gradients which penetrate deep into the rubbed surface to propogate cracking;

b. large pad volumes are required to give a useful working life when large quantities of energy are dissipated;

c. large volumes are conventionally obtained by providing large pad areas, resulting in low clamp stresses, but this does not discourage the formation of high spots, due to failure of the friction material to conform elastically to the rubbed surfaces;

d. the use of softer materials to encourage the dispersion of high spots at a lower braking termperature entails an even larger volume, and hence area, to provide a useful pad life:

e. the larger the pad area the more difficult it is to ensure even distribution of the clamp load.

Thus, there are the requirements of generating high clamp stresses to discourage the formation or maintenance of high spots and providing a large friction element volume to give a useful working life.

One form of known brake comprises a plurality of friction elements arranged to engage a brake rotor, an actuating mechanism operable to apply the friction members to the rotor, and a support arrangement supporting the friction members close to the rotor-engaging ends for transmitting drag forces to the brake structure.

The known brake goes some of the way in meeting the requirements in that by providing a plurality of the friction members they each have a reduced rotor-engaging area to generate higher clamp stresses. However, the length of each friction element is limited and is much less than the lateral dimension of the element, so that the useful working life of each element is limited.

The present invention aims at meeting both of the above mentioned requirements and provides a vehicle brake comprising a plurality of friction members, each of elongated form, which are supported laterally close to their rotor engaging ends by means which transmit drag forces to the brake structure, and an actuating mechanism operable to apply the members to the rotor, the said mechanism being disposed at least partially alongside the friction members.

The use of a number of elongated friction elements of members enables the rotor-engaging areas of the elements to be reduced, with the result that there is less likelihood of the formation of high spots, and by arranging the actuating mechanism alongside the elements, rather than at the ends of the elements, as in known brakes, we avoid any undue increase in the overall length of the brake assembly.

In one constructional form of the invention described below, one brake structure is arranged to span substantially the full width between the wheels of a wheel set, in a manner permitting the use of very long friction members.

Figure 2:
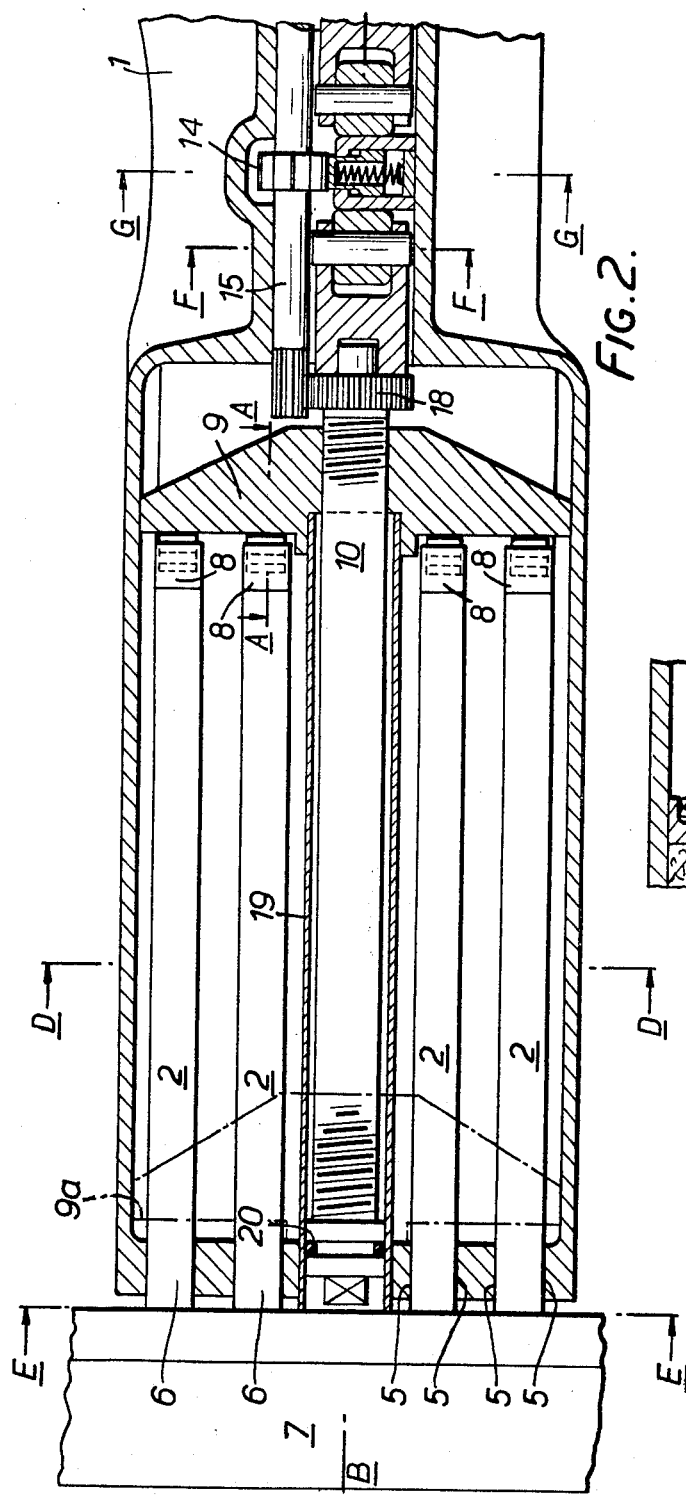
Figure 3:
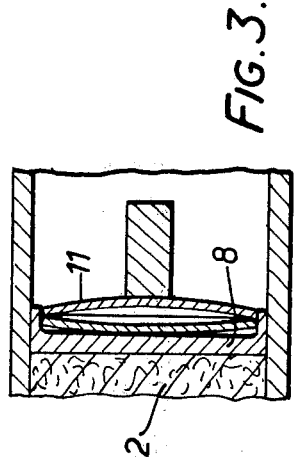
Figure 4:
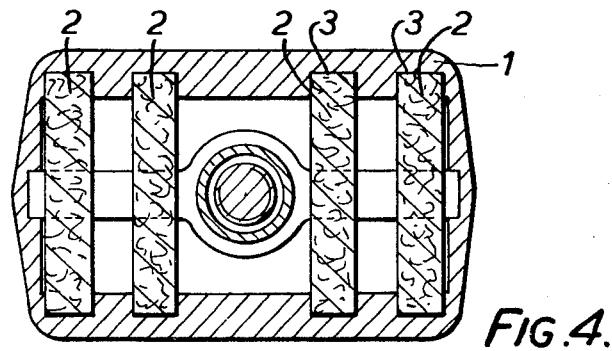
Figure 5:
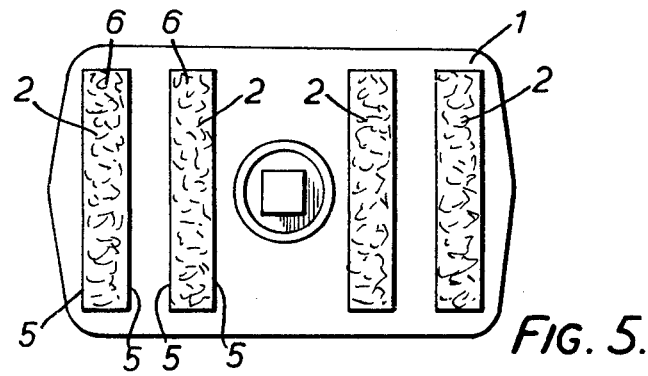
Figure 6:
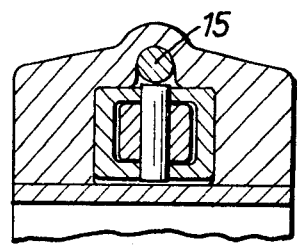
Figure 7:
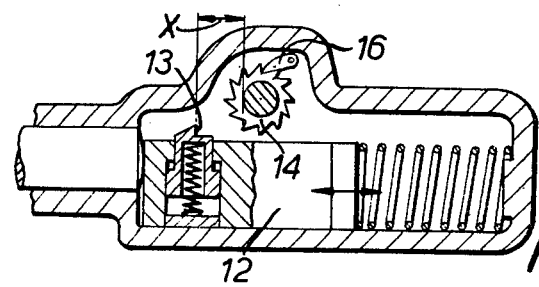

One form of railway vehicle brake in accordance with the invention will now be described, by way of example, with reference to the accompanying drawings in which:

FIG. 1 is an axial cross-section, on the line BB of FIG. 2;

FIG. 2 is an axial section on the line CC of FIG. 1;
FIG. 3 is a part section on the line AA in FIG. 2;
FIG. 4 is a cross-section on the line DD of FIG. 2;
FIG. 5 is a cross-section on the line EE of FIG. 2;
FIG. 6 is a section on the line FF of FIG. 2; and
FIG. 7 is a section on the line GG of FIG. 2.

The brake construction illustrated comprises a main casing 1 shown here as of integral construction but which may alternatively be made in separate axial sections. The casing extends substantially the full length on an axle, terminating close to the inner faces of the wheels 7; the inner faces of which act as braking surfaces. The casing 1 is supported against drag forces generated during braking, but has a degree of axial or "end" float to accommodate wheel set end float.

The brake pads of the brake are constituted by elongated members 2 of friction material which are supported in slots 3 in the casing for movement axially thereof and project through apertures 6 at the adjacent outer end wall of the casing, close to the braking surfaces of the adjacent wheel. In use, the elongated members 2 are forced outwardly of the casing into braking engagement with the wheel 7, the drag forces being transmitted to the side edges 5 of apertures 6 and thus to the casing, so that only a short unsupported length of each member 2 is subjected to bending due to the drag forces.

The inner end of each member 2 is supported by a metal cap 8, preferably having a pre-stressed resilient means, such as a pair of belleville washers 11 through which braking forces are transmitted to the cap 8 and member 2 by a beam 9 which acts on all of the caps 8. The resilient means 11 serve to equalise or compensate the forces transmitted by the beam 9 to the cans 8 and friction members 2. The beam 9 is keyed against rotation by engagement in the axial slots 3, and is screwed onto an adjuster screw 10, extends outwardly through a protective guide tube 19. The outer end of the screw 10 carries a sealed piston 20 which prevents the ingress of dirt. The tube 19 may be of friction material or other expendible material which is progressively worn away by abrasion from the wheel 7, as wear of the members 2 occurs and is compensated in a manner to be described in detail below.

The inner end of the screw 10 is journalled into a blind bore in the adjacent end of a roller-tappet of a wedge-expander 12, located at the mid-point of the casing 1, i.e. approximately on the longitudinal centre-line of the vehicle. The other roller-tappet of the expander acts on a corresponding screw 10 (not shown) for the other wheel 7 of the wheel set.

Actuation of the wedge expander causes both tappets to move outwardly and to act on the respective screws 10, beams 9 and friction members 2, the outer ends of which are thus applied to the inner, braking surfaces of the wheels 7.

Although a highly wear resistant material is preferably employed for the members 2, they will, of course, wear progressively, and this wear must be compensated. Accordingly, there is provided an automatic slack-adjuster, best illustrated in FIGS. 2, 6 and 7, comprising a pawl 13 carried by the actuator wedge, co-operating with a ratchet wheel 14 mounted on a spindle 15, the outer ends of which are provided with or formed as pinions meshing with gear wheels 18 carried by the respective adjuster screws 10. These screws are of opposite hand so that rotation of the spindle 15 in one direction will effect movement in opposite directions of the respective beams 9.

The pawl becomes effective to rotate the ratchet on any actuating stroke of the wedge in excess of the distance X (FIG. 7) by one tooth pitch of the ratchet wheel, reverse rotation of the ratchet being prevented by a stop pawl 16. The distance X is calculated to allow for normal brake clearances, lost motion and structural deflection.

Suitable provision is made, in any convenient known manner, for protecting the slack adjuster components against excessive operating loads, such as resilient means for storing energy to effect adjustment on the return stroke (rather than the actuating stroke), or a frictional clutch means which slips under excessive loads.

FIG. 2 illustrates, at 9A, the position of beam 9 in the "fully worn" conditions of the friction members 2, the end of the casing serving to protect the wheel 7 from damage by any components within the casing.

In the arrangement illustrated, each of the friction members 2 is arranged to engage the whole swept path of the braking surface of wheel 7. Nevertheless, the operative area of each friction member is small so that the problems created by localised high spots is greatly reduced. The volume of the friction material is large, to provide a good wear volume and yet the stresses set up by drag forces are contained within acceptable limits by support of the members close to the braking surface.

The problem of localised high-spots can be mitigated still further, if desired, by employing a larger number of individual friction members, some of which engage an inner annular zone of the swept area while the rest engage an outer annular zone.

Advantages also accrue from using the wheel as the brake rotor by virtue of the large heat sink effect of the wheel, and the large swept area which is obtainable near the rim of the wheel.

Installation of a brake construction as described above presents no special problems. The brake is readily adapted for mounting on standardised bogies, either using the normal mounting slots or existing, alternative brake hanger points.

Another advantage of the construction resides in the fact that, since the friction members are of small cross-section, the heat curing of the organic materials used in the members is greatly facilitated.

I claim:

1. A brake comprising a rotor having a friction surface thereon, means for braking said rotor by applying a braking torque to said friction surface comprising an elongated body of friction material moveable into engagement with the friction surface to apply the brake and which prior to use has a length in its direction of movement substantially greater than its dimension transverse to its direction of movement, said body being disposed wholly on one side of said friction surface and having and second opposed ends, a support for said body of friction material also disposed wholly to said one side of said rotor friction surface and aligned therewith, said support terminating in a torque sustaining end part facing the friction surface of the rotor in close spaced adjacency thereto and laterally supporting said body of friction material adjacent its first end to sustain braking torque exerted thereon when it is moved into engagement with the frictional surface of the rotor, and means for moving said body towards and away from said friction surface to apply and release the brake comprising an axially movable adjusting member extending at least partially alongside said body of friction material to said one side of said rotor friction surface, an element having an axially adjustable connection with said adjusting member and extending rigidly laterally from said connection into operative engagement with the second opposed end of said friction material, means exclusively to said one side of said rotor friction surface for selectively exerting an axial force on said adjusting member in the direction of said rotor friction surface, said element transmitting said force from said adjusting member to said body of friction material for moving its first end into braking engagement with said rotor friction surface in response to the axial force exerted on said adjusting member, and means for operating said adjusting member to move said axially adjustable connection and said element relative to said adjusting member in the direction of said rotor surface to adjust the position of the body of friction material relative to said support.

2. The brake of claim 1 wherein the support and said body of friction material are disposed to said one side of said rotor friction surface so that said support, and the axis and ends of the friction material are within the periphery of said rotor and in substantial alignment with an annular portion of the friction surface of said rotor.

3. The brake according to claim 1 wherein said elongated body of frictional material is a unitary body.

4. The brake according to claim 1 wherein said support is at a constant fixed distance from said rotor friction surface.

5. A brake comprising a rotor having a friction surface thereon, an elongated body of friction material moveable into engagement with the friction surface to apply the brake and which prior to use has a length in its direction of movement substantially greater than its dimension transverse to its direction of movement and having at one end a friction face engageable with said friction surface of said rotor, a support adjacent said rotor and said one end wholly to one side of said friction surface and laterally supporting said one end so that it is facing said friction surface in close adjacency thereto with the axis of the elongated body of friction material extending away from said surface to said one side of said rotor friction surface, an axially movable, elongated adjusting member extending at least partially alongside said body of friction material and being disposed wholly to said one side of said friction surface of said rotor, an element having an axially adjustable connection with said adjusting member and extending rigidly laterally from said connection for operative engagement with the opposed end of said friction material, means to one side of said friction surface for selectively exerting an axial force on said elongated adjusting member in the direction of said rotor friction surface, said element transmitting said force from said adjusting member to said body of friction material for moving said friction face at said one end of said body of friction material into braking engagement with said rotor surface in response to the axial force exerted on said adjusting member, and means for operating said adjusting member to move said element relative thereto in the direction of said rotor friction surface to adjust the position of the body of friction material relative to said surface to compensate for wear of said friction material during use.

6. The brake according to claim 5 wherein said means for exerting an axial force is arranged to exert a compressive force on said adjusting member.

7. The brake according to claim 5, wherein said adjusting member and said body of friction material are received within a housing, and wherein said support comprises the sides of a transverse opening in said housing corresponding to the cross-sectional area of said friction member substantially transverse to its direction of movement.

8. The brake according to claim 7 wherein said adjusting member is an elongate rotatable screw member, said element having screw threaded engagement with said screw member, and means in said housing for restricting said element to linear movement upon rotary movement of said screw member.

9. The brake according to claim 8 wherein said element comprises an abutment member adapted to abut the end of said body of friction material remote from said one end thereof upon axial movement of said screw member towards said rotor surface.

10. The brake according to claim 8 including automatic adjusting means coupled to said screw member for effecting rotation thereof upon predetermined wear of said friction material.

11. The brake according to claim 8 including a tube carried by said element and housing said rotatable screw member, said tube being of abradable material and being urged into engagement with said rotor friction surface by said element to be worn away as said friction material is worn away during use.

12. The brake according to claim 7 wherein said housing is rigidly fixed.

13. The brake according to claim 5 wherein the longitudinal axis of said friction material is substantially parallel with the axis of rotation of said rotor.

* * * * *